H. J. RESCH.
DUST PAN.
APPLICATION FILED JAN. 12, 1912.
1,053,438.
Patented Feb. 18, 1913.
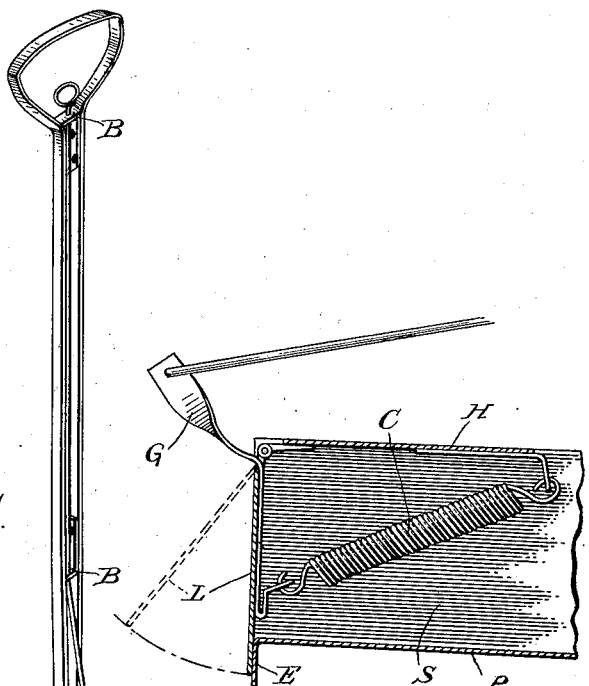
Fig. 1.
Fig. 2.
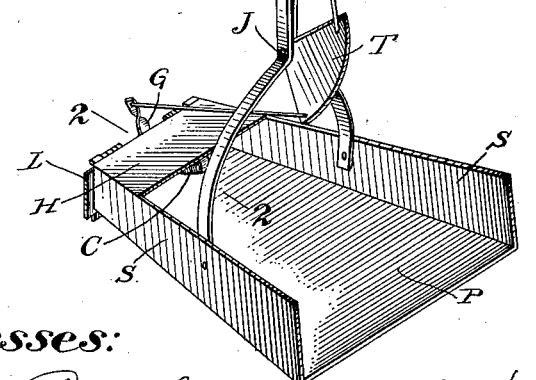
Witnesses:
Peter Resch
Annie Resch
Inventor:
Henry J. Resch

UNITED STATES PATENT OFFICE.

HENRY JACOB RESCH, OF COLUMBUS, OHIO.

DUST-PAN.

1,053,438.

Specification of Letters Patent.

Patented Feb. 18, 1913.

Application filed January 12, 1912. Serial No. 670,966.

*To all whom it may concern:*

Be it known that I, HENRY JACOB RESCH, a citizen of the United States, residing at Columbus, in the county of Franklin and State of Ohio, have invented a new and useful Improvement in Dust-Pans; and I do declare the following to be a full, clear, and exact description of said improvement, such as will enable others skilled in the art to make and use the same, reference being had to the accompanying drawings, and to the figures of reference marked thereon, which form a part of this specification.

This invention relates to dust pans, and it consists in the construction, and the arrangement of parts hereinafter fully set forth and pointed out particularly in the claim.

The object of this invention is to provide a dust pan, very simple and inexpensive in construction, having a pan so arranged as to receive and retain the dirt, the pan being mounted to a handle which causes it to assume a position ready for use when placed upon the floor.

A further object is to pivot the handle to the sides of the pan at points a little to one side of the center of gravity thereof, whereby the pan will hang in a tilted position after being used and the dirt will not fall out again.

Another object is to provide a small door or lid at the narrow end of the pan for the dirt to be passed out.

The above objects are attained by the arrangement and combination of the parts illustrated in the accompanying drawings.

Figure 1 is a perspective view showing the pan ready for use. Fig. 2 is a sectional view on the line 2—2 of Fig. 1.

Referring to the drawing by characters of reference as follows: The pan P is made of sheet metal being broad at one end and narrow at the other end, and having two vertical sides S of equal height and running the entire length of the pan. Over the tops of the sides at the narrow end of the pan is fastened a small hood H, to which the hinges of a lid L, and one end of a spring C, are fastened. The lid is made to extend a short distance beyond the sides and the bottom of the pan as shown in Fig. 1. The bottom of the pan is extended a short distance beyond the narrow end, and is then bent downward, so as to form a small elevation E, at the narrow end and the lower end of the lid passes over the said elevation as shown in Fig. 2.

In the center of the lid is fastened a narrow strip G, of metal which is bent and twisted in such a manner that both ends are of great use. The upper end of the said strip is fastened to a pull wire which opens the said lid. The lower end of the strip G forms a hold for one end of the spring C. Another hold for the other end of the spring is placed at the inner side of the hood H, as shown in Fig. 2.

The handle which forms the greatest part of this improvement is made of narrow hoop iron of any width and thickness, and is made long enough, to require no bending on part of the operator. It is provided with a suitable handhold at the top. The sides of the handle are then spaced a short distance apart by the aid of small braces B. The sides of handle then come close together at a point J, as shown in Fig. 1. At this point they are now spread apart in a semicircle and are then pivoted to the sides of the pan. At the point J a quadrant T, is pivoted to the handle. To the lower end of the quadrant T, is attached the pull wire running from the strip G, attached to the lid L. To the upper end of said quadrant is attached another wire which runs up through holes in the braces B, in the narrow part of the handle, and terminates in a ring for the finger of the operator within the hand hold as shown in Fig. 1.

The use of this pan is very simple, it is placed upon the floor, the dirt is swept in, and carried away. Now the finger is placed in the ring and the latter is pulled upward, whereupon the lid at the narrow end will open and the dirt will now pass out. When the finger is taken out of the ring the lid L, will close very tightly by the action of the spring C.

This pan is intended for home and office use.

The numerous advantages of my improved dust pan will now be obvious, and its construction is simple, durable and inexpensive.

Having thus fully set forth my invention I claim as new, and desire to secure by Letters Patent—

The combination, in a dust pan having a flat bottom, broad at one end and narrow at the other end, two vertical sides of equal height running the entire length of the pan, a small hood or cover over the tops of the sides adjacent the small end, and a long handle pivotally attached to the sides at points forward the center of gravity of the pan, of a small lid at the narrow end hinged to the said hood or cover, and held closed by means of a spring, and means for operating the lid, consisting of a sheet metal quadrant pivoted in the lower part of the handle, the corner ends of which are connected by wires or the like respectively to a projection on the lid, and a ring for the finger of the operator at the top of the handle.

In testimony whereof, I sign this specification, in the presence of two witnesses.

HENRY JACOB RESCH.

Witnesses:
 PETER RESCH,
 Mrs. PETER RESCH.

Copies of this patent may be obtained for five cents each, by addressing the "Commissioner of Patents, Washington, D. C."